Patented Oct. 3, 1939

2,174,563

UNITED STATES PATENT OFFICE 2,174,563

SOLE FITTING MACHINE

William R. Bolton, Chicago, Ill., assignor to United Shoe Machinery Corporation, Paterson, N. J., a corporation of New Jersey Application April 25, 1938, Serial No. 204,015

11 Claims. (Cl. 12—27)

This invention relates to improvements in sole fitting machines and is herein illustrated as embodied in a channeling machine adapted for operating upon insoles for welt shoes.

In the manufacture of insoles for some types of welt shoes, it is desirable to reduce the width of the feather around portions of the forepart of the insole in order to prevent upward curling of the margin of the insole in the forepart of the shoe. One method of producing a sole of this description is to first channel it and then remove the desired portions of the feather which was formed in the channeling operation by a second operation upon the sole in another machine, such for example, as that shown in the United States Letters Patent No. 1,697,283, granted upon an application filed in the name of C. A. Morin.

It is an object of the present invention to provide a channeling machine having an improved feather removing mechanism which is arranged to remove the desired portion of the feather of an insole during the channeling operation and thereby save a machine operation. The illustrated machine, which is a preferred embodiment of the invention, is provided with a work table, an edge knife arranged to slit the margin of an insole placed on the work table to form thereon a lip and feather, an edge gage adjustable transversely to the line of feed of the insole on the work table to regulate the depth of cut made by the edge knife, and a feather removing knife adjustable with respect to the work engaging surface of the edge gage and adapted to be moved relatively thereto upon adjustment of the edge gage to vary the width of the feather formed on the margin of the insole by the edge knife, the illustrated arrangement being such that the feather removing knife is advanced to a position in front of the edge gage where it trims away the feather close to the base of the channel formed by the edge knife when the machine is channeling in the forepart of the sole, and is withdrawn to a position behind the edge gage where it is out of engagement with the feather when the machine is channeling in the shank section of the sole. The amount of feather which is removed may be varied by regulating adjustments which are provided for that purpose.

The words "front" and "back" as applied hereinto the edge gage indicate direction with respect to the work engaging face of the gage.

With the above and other objects in view, this invention will now be described with reference to the accompanying drawings and will be pointed out in the appended claims.

Figure 1:
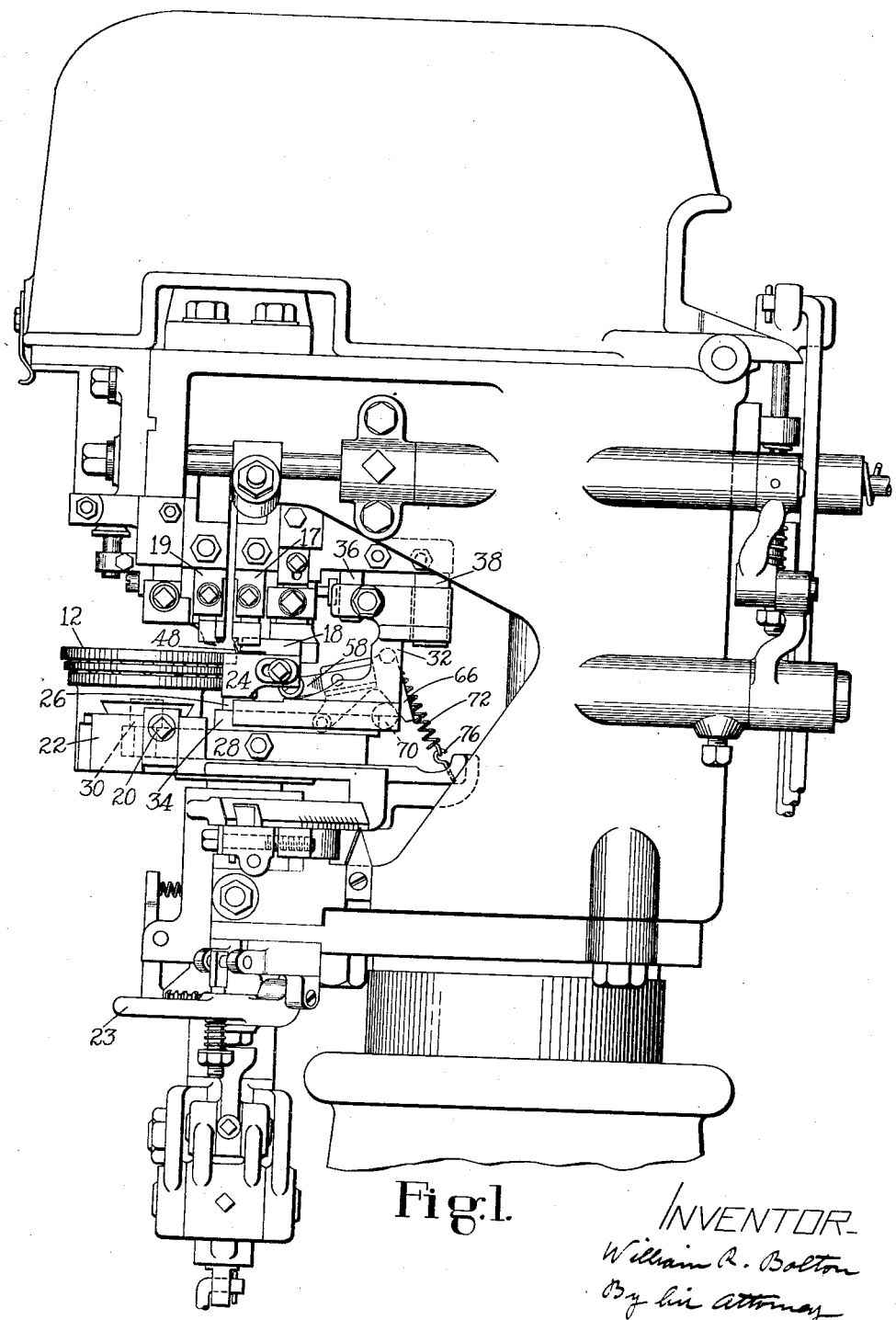
Fig. 1 is a side elevation of a machine embodying this invention.

The machine chosen to illustrate this invention is a channeling machine similar to that disclosed in United States Letters Patent No. 2,015,064, granted on an application filed in the name of F. E. Bertrand and consists of a rotatable work table or support 12, a channeling knife 14 (Fig. 4) for cutting downwardly into the surface of a sole S on the work table to form a channel and an inner lip, an edge knife 16 for slitting the edge of a sole to form an outer lip L and a feather F (Fig. 4), and an edge gage 18 for guiding the work past the channeling knives 14 and 16. The knives 14 and 16 are mounted on knife blocks 17 and 19, respectively, which are attached to oscillatory carriers similar to those indicated by the numerals 62 and 64 in the above-mentioned patent to Bertrand. The work table 12 is fixedly secured by a clamping bolt 20 to a horizontally adjustable carrier 22 which also supports the edge gage 18 and which is movable by a hand crank 23 (Fig. 1) to adjust the edge gage and work table in unison transversely to the direction of the work feed and thus to shift the sole edgewise relatively to the channeling knives so as to vary the distance between the channels and the sole edge or, as it is frequently expressed, to vary the width of the margin.

Figure 6:
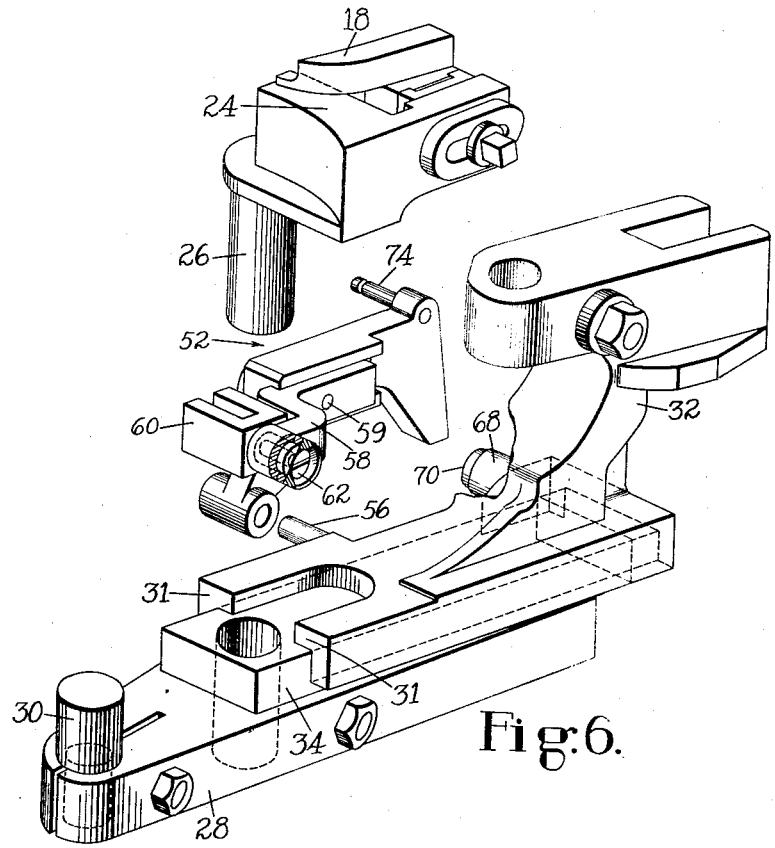
Fig. 6 is an exploded perspective view showing the relationship of various parts which go to make up the shifting mechanism for the feather removing knife.

The edge gage 18 is adjustably mounted on an auxiliary work table 24 (Fig. 6) which is supported by a post 26. The post 26 serves as the connecting means between a lever 28 and a plate 34, being received in aligned openings in these members in the manner indicated in Figs. 2 and 6. The edge gage 18 and the auxiliary work table 24 are oscillated in unison about the work table 12 by the lever 28 which is connected at one end to the work table 12 by a pin 30 (Fig. 1) and is connected at its other end to a rocker member 32 by the plate 34; the plate 34 being slidably received in guides 31 formed on the under surface of the rocker member 32 as shown in Fig. 6. The rocker member 32 is connected to a rockshaft 36 and a plate 38 which form a part of the mechanism which operates the edge knife and which correspond to the rockshaft 158 and arm 570 of the machine shown in the above-mentioned patent to Bertrand No. 2,015,064. The construction and arrangement of the machine parts so far described is similar to that shown in the patent to Bertrand, to which reference may be had for a more detailed description of the same.

The illustrated machine is provided with means for removing the feather F around the forepart of the insole being channeled, the feather removing means comprising a feather removing knife assembly 40 (Fig. 4) slidably mounted in a guideway formed in a lower portion of the knife block 17 below the edge knife 16. The assembly 40 consists of a slide 42 received in the guideway in the block 17; a knife carrier 44 connected to the slide 42 by a tongue-and-groove connection 46 and a stud bolt 47 (Fig. 4) which extends through the carrier 44 and is threaded into the slide 42; and a feather removing knife 48 fastened to the knife carrier 44 by a bolt 50.

When channeling soles it is customary to form different widths of margin in the shank and forepart of the soles, and, while the widths may be varied to suit the needs of the shoe that is being made, in any event the width of the margin in the shank is greater than that around the forepart. It is desirable in the manufacture of insoles for certain kinds of welt shoes to remove substantially all the feather around the forepart while leaving it unimpaired in the shank. In the illustrated machine the removal of the feather around the forepart of a sole is accomplished by connecting the feather removing knife assembly 40 to the edge gage in such a manner that the feather removing knife is moved in unison with but a greater distance than the edge gage; the arrangement being such that the feather removing knife is located in front of the edge gage where it is in a position to remove a portion of the feather when the edge gage is set to gage the relatively narrow width of margin around the forepart of the sole, and will be behind the edge gage and out of contact with the feather when the edge gage is set to gage the cutting of the wider width of margin in the shank.

Figure 2:
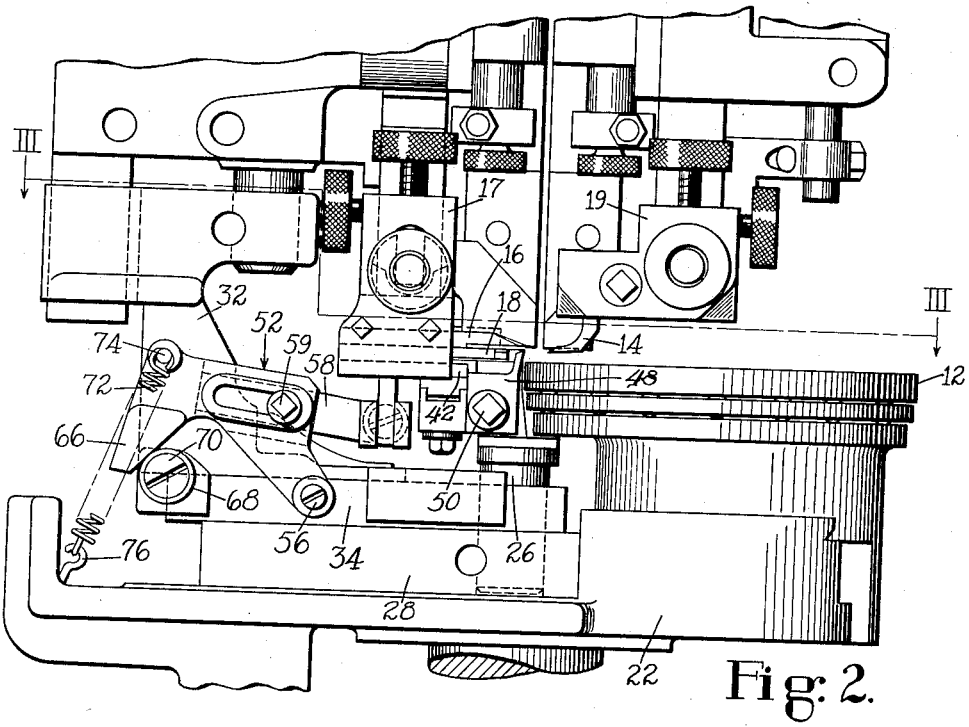
Fig. 2 is an elevation of a portion of the machine shown in Fig. 1 taken from the side opposite to that shown in Fig. 1, and with the feather removing knife in its forward position.
Figure 4:
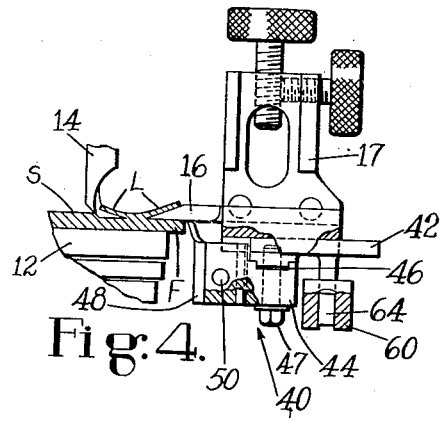
Fig. 4 is an elevation, partly in section, showing the relationship of the edge knife, work table, and feather removing knife when the latter is in its withdrawn position.

The connections between the edge gage 18 and the feather removing knife assembly 40 consists of a lever 52 pivoted on a pin 56 (Figs. 2 and 6) projecting from the plate 34; the plate 34 in turn being pivoted to the post 26 which supports the edge gage 18. The pivoted lever 52 is connected to the slide 42 of the feather removing knife assembly 40 by a U-shaped member 60 pivoted to an arm 58 of the lever 52 by a pin 62; the U-shaped member 60 fitting about a lug 64 depending from the slide 42 (Figs. 2 and 4). The lever 52 is also provided with a downwardly extending cam 66 which slidably engages a rotatable collar 68 on a pin 70 projecting from the rocker member 32 into the path of the cam 66. The cam 66 is held in engagement with the roller 70 by a spring 72 which is connected at its upper end to a pin 74 on the lever 52 and at its lower end to a hook 76 fast to the rear end of the work table carrier 22 as viewed in Fig. 1.

Adjustment of the work table carrier 22 by the hand crank 23 causes a corresponding movement of the edge gage 18 and feather removing knife 48 due to the fact that both of these members are connected to the pin 26 which in turn is connected by the lever 28 and the work table 12 to the carrier 22. Thus the carrier 22, edge gage 18, and feather removing knife 48 will move as a unit with respect to the knives 14 and 16 and the rocker member 32 which is connected to the operating mechanism for the edge knife 16; however, the feather removing knife 48 will be moved a greater distance than the edge gage 18 due to the fact that movement of the table carrier 22 will cause the cam 66 to ride up or down (depending on the direction of the movement) on the collar 68 of the relatively fixed pin 70 thus rotating the shifting lever 52. The differential in the movement of the knife 48 and the edge gage 18 is equal to the horizontal component of the arcuate movement of the lever 52 as the knife 48 is moved a distance equal to the movement of the carrier 22 plus the horizontal component of the arc through which the lever 52 has been moved, while the edge gage, being directly connected to the carrier 22 by the lever 28 and work table 12, will only move a distance equal to the movement of the carrier 22. While the mechanism just described constitutes a convenient arrangement for connecting the shifting lever 52 to the carrier 22 so as to cause the lever to partake of the movement of the carrier, there are obviously numerous other ways of accomplishing this result as, for example, the lever might be directly connected with the carrier through a lug on the carrier or some other convenient medium. Likewise, the feather removing knife assembly 40 might be mounted upon other forms of support without departing from the spirit of this invention.

Figure 5:
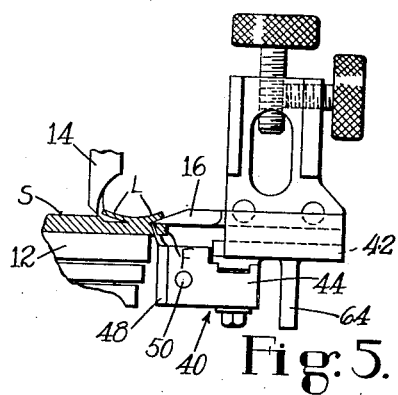
Fig. 5 is an elevation similar to Fig. 4 showing the feather removing knife at its forward position wherein it is removing the feather on an insole.

The width of feather which is removed by the feather removing knife 48 is determined by the setting of the adjustable arm 58 of the shifting lever 52; the arm 58 controlling the forward limit of the traverse of the feather removing knife which is the position where it removes the greatest width of feather. To change the forward limit of travel of the feather removing knige 48, the clamping bolt 59 is loosened and the adjustable arm 58 is shifted to a selected position where the bolt 59 is tightened to hold the arm in that position. As illustrated, the adjustment of the arm 58 is such that upon movement of the edge gage to the position in which it controls the channeling of the narrowest width of margin around the forepart of a shoe (Figs. 2 and 5), the feather removing knife is moved to its forward limit of travel which is beyond the face of the edge gage and in a position where its edge is in substantial coincidence with the face of the edge knife 16, in which position the feather will be removed at the base of the channel cut by the edge knife. To reduce the maximum width of feather which is removed by the knife 48 to, for example, one half of the full width of feather, the bolt 59 would be loosened and the arm 58 moved to the left as viewed in Fig. 2 sufficiently to move the knife 48 back from the face of the edge knife 16 a distance equal to one half the width of margin when the bolt 59 would be tightened to hold the arm 58 in that position.

Figure 3:
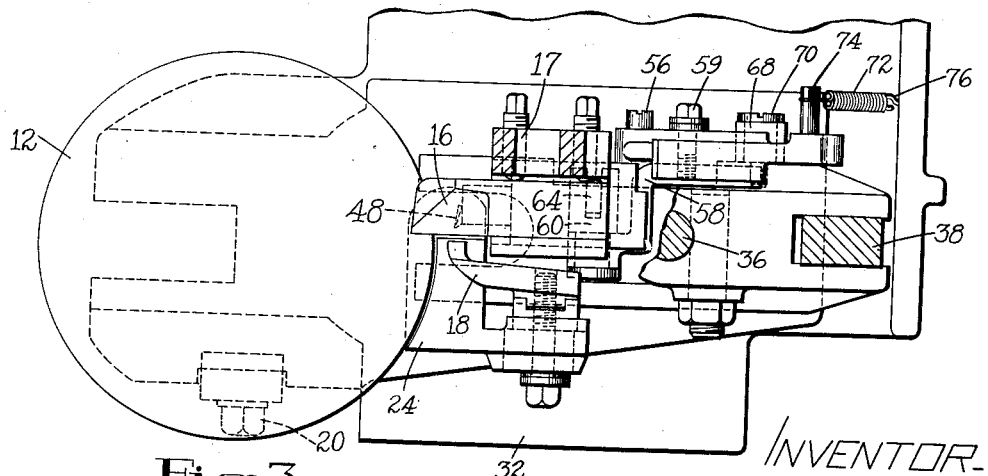
Fig. 3 is a plan view taken along the line III—III of Fig. 2 with certain parts omitted for the sake of clarity and with the feather removing knife in a withdrawn position.

In operating upon an insole the channeling operation is started in the shank portion of the sole and the edge gage is set for gaging cutting of the maximum width of margin in which position the feather removing knife will be behind the edge gage and out of engagement with the insole (Fig. 3). As the channeling operation progresses from the shank to the forepart, the carrier 22 is moved forwardly (to the right as viewed in Fig. 2) to reduce the width of margin; the movement of the carrier 22 causing a corresponding forward movement of the plate 34, shifting lever 52, and feather removing knife 48. As the rocker member 32 is not affected by the forward movement of the carrier 22, that movement will also cause the cam 66 of the lever 52 to ride up on the pin 70 rotating the lever 52 whereby there is imparted to the feather removing knife a total movement which is equal to the sum of the forward movement of the plate 22 plus the horizontal component of the arc through which the lever 52 has been rotated. This will result in the feather removing knife being moved forward a greater distance than the edge gage and will cause it to move from its position behind the edge gage to one in front of the gage where it is in cutting engagement with the feather on the insole and will then remove a portion of the feather. As the channeling continues around the forepart, the amount of the feather which is removed depends upon the setting of the edge gage, the maximum amount of feather being removed when the gage is set for a minimum margin. As the channeling operation passes from the forepart back to the shank on the side of the sole opposite to the one where the operation was started, the edge gage is again moved back to its setting for a maximum margin whereupon the feather removing knife will be moved behind the edge gage and out of contact with the feather.

Having described my invention what I claim as new and desire to have secured by Letters Patent of the United States is:

1. A sole fitting machine having in combination, a work support, a knife arranged to form a feather on a sole on the work support, an adjustable feather removing knife for varying the width of the feather formed by said feather-forming knife, and means for varying the position of the feather removing knife as a sole is being operated upon thereby to vary the extent of the feather removed by the feather removing knife.

2. A sole fitting machine having in combination, a work support, a knife arranged to form a feather on a sole on the work support, an edge gage for regulating the width of feather formed by the feather forming knife, a feather removing knife arranged for adjustment relatively to the feather forming knife, and means for moving the feather removing knife relatively to the feather forming knife during the operation upon the sole thereby to vary the width of the feather formed by the feather forming knife.

3. A sole fitting machine having in combination, a work support, a knife arranged to cut the margin of a sole on the work support so as to form a feather thereon, an edge gage for regulating the width of the feather formed by the feather forming knife, a feather removing knife mounted for adjustment relatively to the edge gage and arranged to remove a portion of the feather formed by the feather forming knife in certain of its positions of adjustment, and means for moving the edge gage and the feather removing knife differential amounts relatively to the line of feed of a sole on the work support, said means being arranged to move the feather removing knife a greater distance than the edge gage whereby the feather removing knife will be adjusted relatively to the edge gage and a varying amount of the feather formed by the feather forming knife will be removed by the feather removing knife.

4. A sole fitting machine having in combination, a work support, a knife arranged to form a feather on a sole on the work support, an edge gage for guiding a sole past the feather forming knife, an adjustable feather removing knife arranged for movement between a position behind the guiding face of the edge gage where it is out of contact with a sole and a position in front of the edge gage where it will remove a portion of the feather formed by the feather forming knife, and means for shifting the feather removing knife between said positions during the sole fitting operation thereby to vary the width of the feather formed by the feather forming knife.

5. A sole fitting machine having in combination, a work support, a channeling knife arranged to cut a channel thereby forming a feather on a sole on the work support, an adjustable edge gage for regulating the depth of cut made by the channeling knife, a feather removing knife arranged for movement between a position behind the guiding face of the edge gage where it is out of contact with a sole on the work support and a position in front of the edge gage where it will remove a portion of a feather cut by the channeling knife, and means for moving the edge gage and the feather removing knife differential amounts relatively to the channeling knife for varying the width of feather cut by the channeling knife and for varying the amount of the feather which is removed by the feather removing knife.

6. A sole fitting machine having in combination, a work support, a channeling knife arranged to cut a channel thereby forming a feather in a sole on the work support, an edge gage arranged for adjustment transversely to the line of feed of a sole on the work support to regulate the depth of cut made by the channeling knife, a feather removing knife arranged for adjustment relatively to the edge gage and arranged to remove a portion of the feather formed by the channeling knife in certain positions of adjustment, and means for moving the edge gage and the feather removing knife differential amounts relatively to the line of feed of a sole on the work support, said means comprising an adjustable member for shifting the edge gage and a lever connected with said adjustable member and arranged to shift said feather removing knife.

7. A sole fitting machine having in combination, a work support, a channeling knife arranged to cut a channel thereby forming a feather on a sole on the work support, an adjustable edge gage for regulating the depth of cut made by the channeling knife, a feather removing knife arranged for movement between a position behind the guiding face of the edge gage where it is out of contact with a sole and a position in front of the edge gage where it will remove a portion of a feather cut by the channeling knife, and means for moving the edge gage and the feather removing knife differential amounts relatively to the channeling knife for varying the width of feather cut by the channeling knife and for varying the relationship between the feather removing knife and the guiding face of the edge gage to thereby vary the amount of feather which is removed by the feather removing knife, said means comprising an adjustable member for shifting said edge gage and a shifting lever for the feather removing knife connected with said adjustable member and arranged for rotation upon movement of the adjustable member whereby, upon movement of the adjustable member the distance moved by said feather removing knife will differ from that of the edge gage by an amount equal to a component of the arcuate movement of the lever.

8. A sole fitting machine having in combination, a work support, a channeling knife arranged to cut a channel thereby forming a feather on a sole on the work support, an adjustable edge gage for varying the depth of cut made by said knife, and an adjustable feather removing means operated by said edge gage, said feather removing means comprising a feather removing knife and connections between said knife and the edge gage arranged to move said feather removing knife between a position behind the work engaging face of the edge gage where it is out of contact with the work and a position in front of the edge gage where it will remove a portion of a feather cut by the channeling knife, the connections being so constructed and arranged that the feather removing knife is moved to a position in front of the edge gage when the edge gage is adjusted for gaging shallow cuts around the forepart of an insole and is moved to a position behind the edge gage when the gage is adjusted for gaging deeper cuts.

9. A sole fitting machine having in combination, a work support, a channeling knife arranged to cut a channel thereby forming a feather in the margin of a sole on the work support, a carrier for said knife, said carrier being arranged to receive a feather removing knife, a feather removing knife shiftably mounted on said carrier, an adjustable edge gage for varying the depth of the cut made by the channeling knife, connections between said feather removing knife and said edge gage comprising a pivoted lever having a cam formed thereon, and a cam operating member positioned in the path of movement of the cam and arranged to rotate the lever upon movement of the edge gage and feather removing knife whereby the feather removing knife will be moved a greater distance than the edge gage by an amount equal to a component of the movement of the pivoted lever.

10. A channeling machine having in combination, a work support, an edge gage adjustable transversely to the line of feed of a sole on the work support, a channeling knife arranged to cut a channel thereby forming a feather in a sole on the work support, a carrier for said channeling knife, said carrier being arranged to slidably receive a feather removing knife, a feather removing knife mounted on said carrier and arranged for movement between a position behind the work engaging face of the edge gage where it is out of contact with the work and a position in front of the edge gage where it is adapted to remove a portion of a feather cut by the channeling knife, and connections between said feather removing knife and the edge gage for moving the feather removing knife with the edge gage but a differential amount relatively to the line of feed, said connections comprising a pivoted lever having a cam formed thereon, and a cam operating member arranged in the path of movement of said pivoted lever whereby upon movement of said edge gage relatively to the line of feed of a sole on the work support the pivoted lever is moved with the edge gage and is also rotated by the cam operating member, the connections being so arranged that when the edge gage is adjusted for gaging the cutting of the narrowest width of feather by the channeling knife, the feather removing knife is moved to a position in front of the edge gage where it removes the greatest width of feather and when the edge gage is adjusted for gaging the cutting of the widest width of feather the feather removing knife is withdrawn behind the edge gage.

11. A sole fitting machine for operating upon soles having a feather formed thereon comprising a work support, work feeding means, an edge gage arranged for engagement with the feather edge face of a sole member on the work support, an adjustable feather removing knife arranged for movement relatively to the edge gage for varying the width of the feather on the sole, and means for shifting the feather removing knife while a sole is being fed through the machine thereby to vary the width of the feather on the sole.

WILLIAM R. BOLTON.